United States Patent [19]
Parks, Jr. et al.

[11] Patent Number: 5,090,661
[45] Date of Patent: Feb. 25, 1992

[54] GATE VALVE

[75] Inventors: Glenn C. Parks, Jr., Houston; C. Mack Ellison, Tomball; William L. Godare; John Beson, both of Houston, all of Tex.

[73] Assignee: Foster Oilfield Equipment Co., Houston, Tex.

[21] Appl. No.: 589,956

[22] Filed: Sep. 28, 1990

[51] Int. Cl.$^5$ .................................................. F16K 3/16
[52] U.S. Cl. .................................... 251/172; 251/174
[58] Field of Search ............................ 251/172, 174

[56] References Cited

U.S. PATENT DOCUMENTS

| | | |
|---|---|---|
| 1,692,496 | 10/1928 | Frob . |
| 2,134,277 | 10/1938 | Sproull et al. . |
| 2,203,989 | 6/1940 | Hamer . |
| 2,471,941 | 5/1949 | Downey . |
| 2,776,813 | 1/1957 | Blackman . |
| 2,957,492 | 10/1960 | Volpin . |
| 3,006,599 | 10/1961 | Eckert . |
| 3,057,630 | 10/1962 | Sneed . |
| 3,095,604 | 7/1963 | Ackaret . |
| 3,103,366 | 9/1963 | Dunn . |
| 3,121,553 | 2/1964 | Grove . |
| 3,135,285 | 6/1964 | Yolpin . |
| 3,273,855 | 9/1966 | Wells . |
| 3,321,176 | 5/1967 | Bolling . |
| 3,339,886 | 9/1962 | Grove . |
| 3,348,567 | 10/1967 | Volpin . |
| 3,472,270 | 10/1969 | Masheder . |
| 3,497,177 | 2/1970 | Hulsey .................... 251/174 X |
| 3,504,885 | 4/1970 | Hulsey ...................... 251/172 |
| 3,538,938 | 10/1970 | Volpin . |
| 3,557,822 | 1/1971 | Chronister . |
| 3,696,831 | 10/1972 | Fowler et al. . |
| 3,758,072 | 9/1973 | Herd . |
| 4,124,194 | 11/1978 | Alvarez et al. . |
| 4,163,544 | 8/1979 | Fowler et al. . |
| 4,264,054 | 4/1981 | Morrill . |
| 4,280,522 | 7/1981 | Pechnyo et al. ......... 251/174 X |
| 4,376,526 | 3/1983 | Freeman . |
| 4,377,273 | 3/1983 | Beson . |
| 4,434,967 | 3/1984 | Vanderburg . |
| 4,487,393 | 12/1984 | Eagen . |
| 4,625,942 | 12/1986 | Nelson ...................... 251/172 X |

OTHER PUBLICATIONS

Foster Value Company Brochure, Model 500, on Sale Prior to 28 Sep. 1989.

*Primary Examiner*—John C. Fox
*Attorney, Agent, or Firm*—Edgar A. Zarins; Malcolm L. Sutherland

[57] ABSTRACT

Gate valve having a primary seal, actuated by fluid pressure in the flow conduit, for preventing leakage along the gate member on the upstream side of the gate valve and a secondary seal actuated by fluid pressure upon leaking of the primary seal and including a self-actuating relief means to prevent build-up of fluid pressure in the valve body in excess of the pressure in the flow conduit.

7 Claims, 2 Drawing Sheets

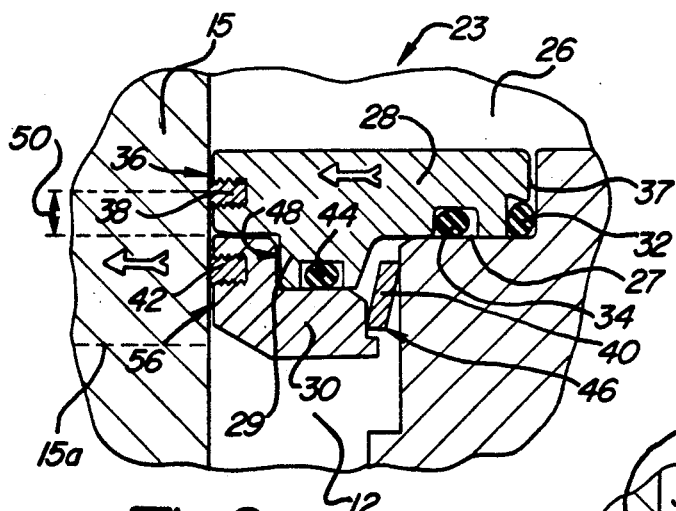
_Fig-2_
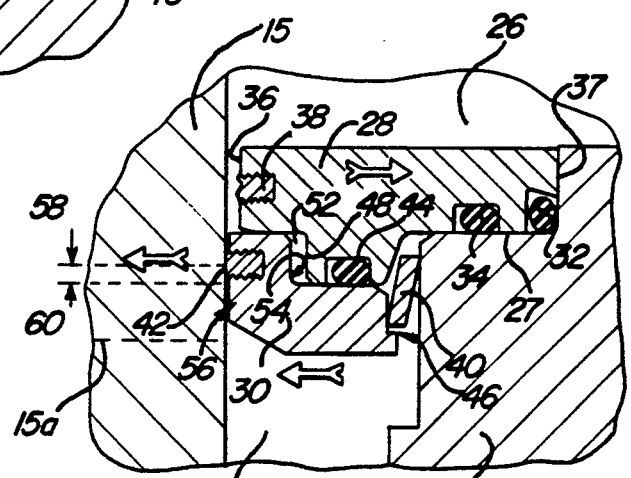
_Fig-3_
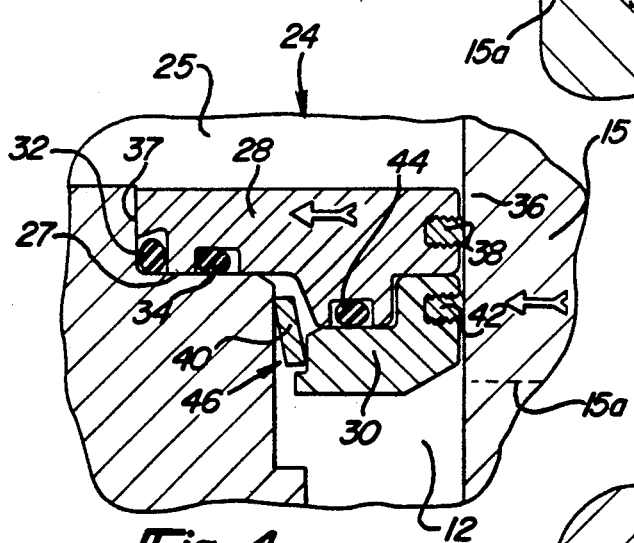
_Fig-4_
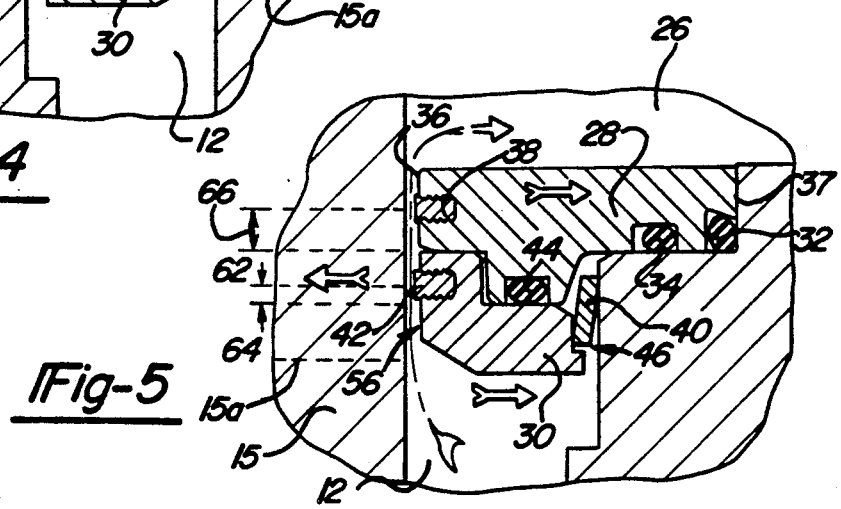
_Fig-5_

GATE VALVE

TECHNICAL FIELD

The present invention relates to gate valves and, more specifically, it relates to gate valves having a primary seal, and a secondary seal with a block and bleed feature.

BACKGROUND OF THE INVENTION

Gate valves have been commonly used for many years and have been employed in a variety of services such as in the oil and/or gas services of the petroleum industry. However, such valves have been designed for service involving pressures of several thousand pounds per square inch. Today it is necessary to have block and bleed valves at such a pressure range. Also, today due to the depleted energy supply it has become necessary to explore and produce oil and gas under very high pressures of the range 30,000 psi (pounds per square inch) or more. Such high pressures have required greater sealing capacity and better safety features in such valves.

Prior art gate valves generally consist of a valve body having inlet and outlet conduits with a chamber therebetween. A gate having an opening therethrough is disposed in a valve seat mounted within the chamber and the gate is mounted on a stem. The chamber is closed by a bonnet affixed to the valve housing. The stem reciprocates within the bonnet and is attached to a reciprocating apparatus for moving the gate between a closed position in which flow is blocked through the conduits and the gate opening. Such a valve is illustrated in U.S. Pat. Nos. 3,538,938 and 3,696,831.

It is also well known to seal between the valve seat and the valve housing by using an O-ring as shown in U.S. Pat. Nos. 2,957,492 and 3,348,567 and non extrusion seals as shown in U.S. Pat. No. 4,264,054. Further in automatic pressure sealed gate valves shown in U.S. Pat. Nos. 3,095,604; 3,538,938; and 3,696,831, fluent sealant rings are disposed around the valve seats to provide sealing between the valve housing and valve seats in response to line pressure on fluent sealant reservoirs in communication with the fluent sealant rings, and O-rings are installed on each side of the sealant rings to isolate the fluent sealant in the fluent sealant rings from contamination by line fluids. It is also known to locate an O-ring seal on the end of the gate seat as shown in U.S. Pat. No. 3,696,831. U.S. Pat. Nos. 3,057,630 and 3,758,072 teach combining an elastomeric O-ring and a polyfluoroethylene polymer such as the brand "Teflon" or "nylon" or other low-friction plastic ring to make a seal ring. Further, U.S. Pat. No. 3,103,366 teaches a deformable metal ring, as for example of aluminum, with an inner deformable plastic ring of polytetrafluoroethylene whereby the metal ring can adapt itself to slightly varying recess clearances and prevent the plastic ring from extruding through the clearances under pressure.

Two piece seats are also known in the art for floating seats as shown by brochures of Model 20 gate valves of FMC, and for replaceable seals through non metallic inserts to seats of Seaboard as shown by its brochure and U.S. Pat. Nos. 4,376,526 and 4,124,194. Another replaceable seal in seats is shown by U.S. Pat. No. 4,163,544. A floating seat with a replaceable seal support element is shown by U.S. Pat. No. 3,273,855. Secondary seals where the gate forms a metal-to-metal seal with the seat and where a resilient seal is moved toward the gate when the gate is in the closed position to form a secondary fluid-tight seal with the gate is shown by U.S. Pat. No. 4,377,273. Manual operations for removal of flow blocking plates and primary seal actuation after such removal are shown in U.S. Pat. No. 2,203,989. Sliding seals are shown in U.S. Pat. No. 2,471,941. Other valve seals are shown by U.S. Pat. Nos. 3,472,270, 2,134,277, 2,776,813, 1,692,496, and 3,557,822.

As discussed in U.S. Pat. No. 4,377,273, one problem frequently encountered in the case of gate valves is the lack of formation of adequate seals between the gate or gates and the seat or seats. In turn, if a seal is inadequate, the gate valves are often prone to leak through the seal. In U.S. Pat. No. 4,377,273, an invention is disclosed which seeks to provide an adequate seal for gate valves in the form of a positive bidirectional cam actuated and deactuated resilient secondary fluid seal.

While the invention described in U.S. Pat. No. 4,377,273 is believed to be advantageous for many applications, it has been found that there are applications in which other secondary seals may be provided. For example, in high pressure situations wherein the formation of the secondary seal causes a significant pressure differential on the two sides of the gate and/or wherein the secondary seal is located on the downstream side, it has been found that for some applications, the drag on the secondary seal caused by movement of the gate to open when the secondary seal is fully effected may exaggerate the wear of the secondary seal. The additional drag on the gate also increases the effort required to open the valve. It is desirable in those instances to be able to deenergize or release the secondary seal prior to substantial linear movement of the gate across the seal. United States patent application Ser. No. 493,045 filed Mar. 12, 1990, by John Beson for GATE VALVE describes a gate valve commercially sold by Foster Valve Corporation as Model 500 which provides such a secondary seal downstream of the gate itself.

SUMMARY OF THE INVENTION

The present invention provides a means for providing a gate valve in a conduit carrying fluid under pressure which has a block and bleed feature by providing upstream and downstream primary and secondary seals that are activated by spring members and the pressure of fluid in the conduit.

More specifically, the present invention includes a gate valve comprising a valve body having a valve chamber therewithin and a pair of flow passages through the valve body aligned at opposite sides of the valve chamber. The valve body further has a recess around the inner ends of each of the aligned flow passages with a primary seal seat member disposed in each recess. Each ring-shaped seat member is disposed in a recess around the inner end of the flow passages adjoining the gate of the valve and a secondary seal seat member is slidably disposed around one or both of the ring-shaped seat members. The secondary seal seat member comprises a ring-shaped support element including one end portion extending along the side of the gate. The primary seal seat member and secondary seal seat member each slide within the recess and the seals. Seal means all supported by the ring-shaped primary and secondary seat members at the end portions thereof facing the gate and spring means are provided for each seat member to bias the seat member to bear against the gate and seals against fluid flow along the face of the gate. The construction and placement of these various parts of the gate valve of this invention, as more fully described below, is such that, when the gate is closed, the fluid pressure in the conduit energizes the primary seal. However, if the primary seal should leak at the gate, this fluid pressure will then energize the secondary seal. Additionally, if the pressure in the valve body should exceed the pressure in the conduit, both the primary and secondary seals will open to permit the pressure in the valve body to be equalized with the pressure in the conduit. These movements of the primary seal seat member and secondary seal seat member are accomplished by providing an appropriate differential surface area at the end portions of the seat member upon which the fluid pressure acts. The flow passage through the valve body is sealed by the fluid pressure in the conduit forcing the primary upstream primary seal against the gate. Since the valve body is sealed upstream, the valve body can be drained, or its pressure reduced below that known to be in the conduit and the block and bleed feature of checking the seals for leakage is accomplished.

Accordingly, the present invention provides a gate valve having both a primary seal and secondary seal upstream of the gate constructed to provide a means for block and bleed function. The present invention may also provide a pressure relief function for preventing damage to the gate valve if fluid pressure in the valve body exceeds a selected pressure level.

BRIEF DESCRIPTION OF THE DRAWINGS

These and other advantages of the present invention will further be illustrated by reference to the appended drawings which illustrate particular embodiments of a gate valve constructed in accordance with the present invention and in which like parts are given like reference numerals, and wherein:

FIGS. 2, 3, 4 and 5 are partial vertical cross sections illustrating how the primary seal and secondary seal of FIG. 1 operate.

DETAILED DESCRIPTION OF THE EMBODIMENTS

Figure 1:
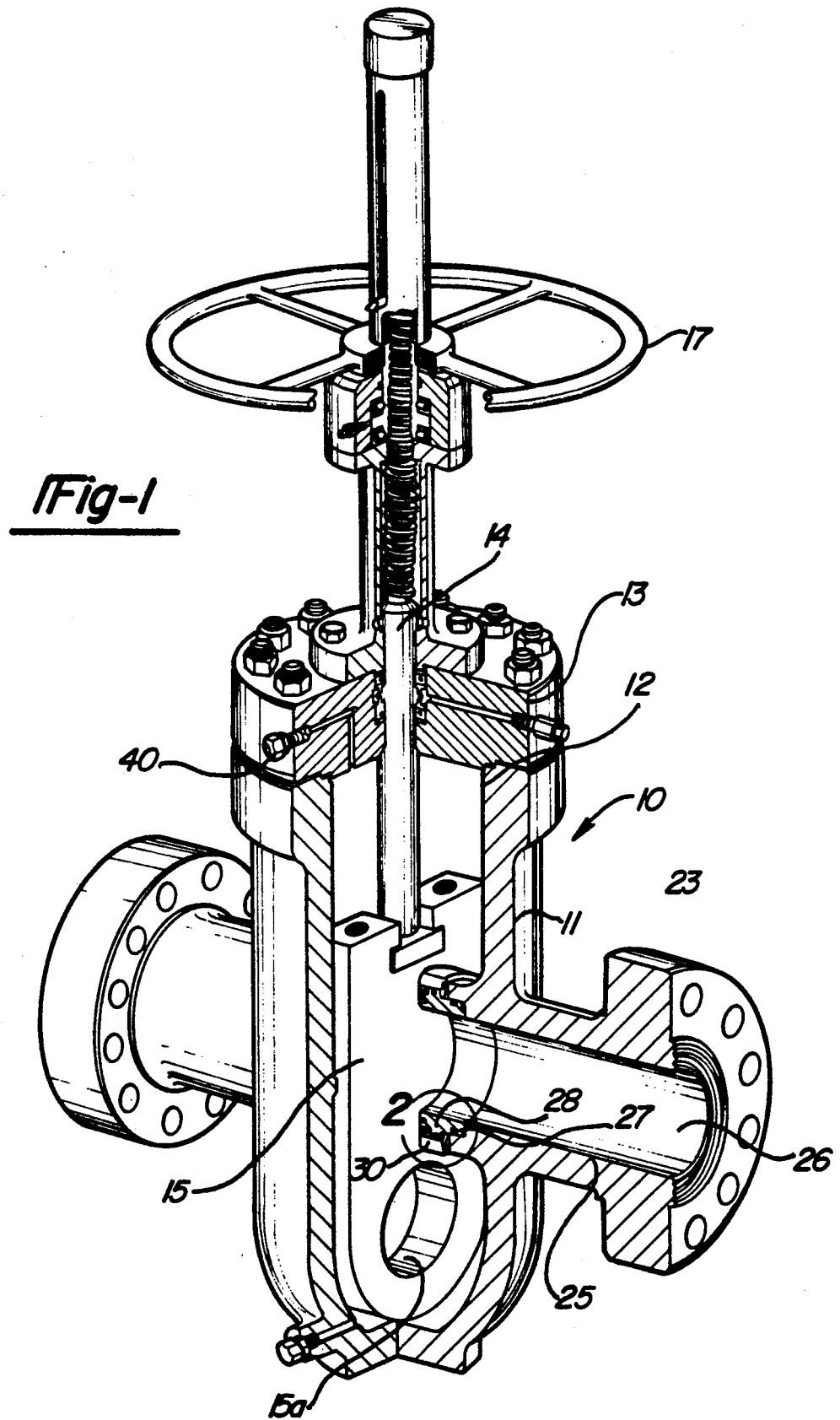
FIG. 1 is a vertical axial cross section illustrating a preferred embodiment of a gate valve constructed in accordance with the present invention.

Specific embodiments of a gate valve are illustrated which will accommodate the use of a secondary seal assembly. The gate valves illustrated are of a rising stem style similar to that shown in U.S. Pat. 4,377,273, which is incorporated herein by reference. It will become apparent to those skilled in the art in view of the above and below disclosure that the present invention could be similarly utilized with slab gate valves, split gate valves, balanced stem valves, or non-rising stem valves and other valves which use seats and seals that are not gate valves.

Referring to FIGS. 1 and 2 through 5, the gate valve 10 includes a valve body 11 which is hollow, having a valve chamber 12 therewithin. The upper or bonnet portion 13 of the valve may comprise a bonnet of any conventional form which provides a closure of the upper end of the chamber 12 and forms a seal between the valve body 11 and a stem 14.

The valve 10 includes a gate element 15 disposed within the chamber 12. The gate 15 has, generally, surfaces rectangular in section and is interconnected at the top with the stem 14. The stem 14 is adapted to raise and lower the gate 15 upon the selective movement of the stem 14.

Vertical movement of the stem may be provided in a variety of manners. In the embodiment illustrated, the stem 14 may typically have threaded engagement with a nut, so that rotation of the nut by wheel 17 causes longitudinal movements of the stem 14 and the gate 15 in either direction.

It will be appreciated by those of skill in the art that these and other suitable means for attaching the stem 14 to the gate 15 may be utilized in accordance with the present invention.

Referring again to FIGS. 1 and 2 through 5, two opposite formations 23, 24 (illustrated by FIGS. 2 and 4) are constructed around the inner ends of the opposed aligned flow passages 25, 26 of the valve body 11. The gate 15 has a flowport 15a therethrough which is positioned such that when the gate is moved upwardly in FIG. 1 to be opened, the flow port 15a aligns with passages 25 and 26. A stepped annular recess 27 is formed around each of the flow passages 25, 26 concentrically into formations 23, 24, a ring-shaped primary seal seat member 28 having an outwardly enlarged portion 29 and a ring-shaped secondary seal member 30 are mounted in the recess 27.

Referring more specifically to FIGS. 2 through 5, it will be seen that formations 23, 24 are identical, being mirror images of each other. The seal seat members are slidably mounted in recesses 27 with close tolerances. Primary seal seat member 28 is biased against gate 15 by O-ring spring 32. It will be appreciated, however, that other types of springs could be used. A seal between the seat member 28 against the valve body is provided by O-ring 34 in recess 27. A seal is provided between the endface 36 of seat member 28 by seal 38 which is of conventional construction. As shown, seal 38 is a Teflon ring seal force fitted with a groove cut in endface 36. Ring-shaped seat member 30 of the secondary seal is made to fit around seat member 28. Seat member 30 is biased against gate 15 by spring 40, as shown, preferably a Belleville spring. Seat member 30 is sealed at gate 15 by seal 42, similar to seal 38. A seal 44 is also provided between seat member 28 and seat member 30. Seal 44, as shown, is preferably, an O-ring mounted in a groove cut in enlarged portion 29 of the seat member 28.

Operation of the primary seal and secondary seal are illustrated in FIGS. 2 through 5 which show the forces applied under different conditions when the gate 15 is closed. FIG. 2 illustrates the primary seal energized at the high pressure side of the gate, i.e. upstream side. Under these conditions, O-ring spring 32 biases primary seat 28 against gate 15 to provide an initial seal against fluid pressure in line 26 by ring seal 38 bearing against the surface of gate 15. The fluid pressure in line 26 acts against the endface 36 of the seat 28 and against the opposite endface 37. Since O-ring seal 34 forms a seal between seat 28 and valve body 10 and ring seal 38 forms a seal between seat 28 and gate 15, the fluid pressure in conduit 26 acts against surfaces of different area. Endfaces 36 and 37 are sized such that the surface area to which the line 26 fluid pressure is applied at endface 37 is greater than the surface area to which such pressure is applied at endface 36 to provide a differential surface area. Accordingly, seat 28 is forced against gate 15 by the fluid pressure and the primary seal is effected, preventing leakage at endface 36. A way to describe this differential area is illustrated by arrow 50. Referring to the centerline of conduit 26, the differential area is the difference in area generated by a radius between the centerline and seal at ring seal 38 and the area generated by a radius between the centerline and the seal formed at O-ring seal 34. Under the conditions of FIG. 2, spring 40 biases endface 56 of the secondary seat member 30 against gate 15. If the primary seal at endface 36 is compromised, e.g. by wear at endface 36, the conditions of FIG. 3 apply. The fluid from line 26 will pass between seat 28 and the gate 15 to the secondary seat member 30, and because of the initial seal provided at seal 42 by spring 40, the force applied at endface 36 is now applied also at endface 48 to create space 52. The force of the fluid pressure in line 26 in space 52 is also applied against endface 54 of the secondary seat member 30 and forces endface 56 against the gate 15 to create the secondary seal preventing leakage from conduit 26. Under the conditions of FIG. 3, the differential surface area, illustrated by arrows 58 and 60, provides the force to establish the secondary seal. Since the fluid pressure applied at endfaces 54 and 36 is the same, the differential surface area illustrated by arrows 58, 60 means that greater force is applied against endface 54. FIG. 4 illustrates the downstream side of the gate, which usually will be at a pressure less than the upstream side. Fluid pressure from the upstream side of line 26 forces gate 15 against the endface 36 of seat 28 which abuts against the wall of recess 27 on the downstream side to energize the primary seal at ring seal 38. Pressure in chamber 12 also will seal at O-rings 34 and 44 and secondary seal 42 is held against gate 15 by spring 40. While chamber 12 of the valve body typically will be at, or near, the pressure of the upstream side of line 26 because it will be filled in opening and closing the gate, under some conditions, e.g., heating under hot sun, etc. the pressure in chamber 12 can increase. Frequently this excess pressure is handled by a relief valve in chamber 12. The present valve is self-venting which removes the need for a relief valve which may not work. As illustrated by FIG. 5, self-venting of chamber 12 into the upstream side of line 26 occurs whenever the pressure in chamber 12 exceeds the pressure in line 26 by a predetermined amount. As discussed above, spring 40 biases secondary seat member 30 and endface 56 against gate 15 to provide an initial seal When )eakage occurs at endface 36. In the present invention the spring force of spring 40 and the forces applied by fluid pressure in chamber 40 at endface 56, the endface of seat member 30 adjacent spring 40 and in chamber 52 are selected so that if the pressure in chamber 12 exceeds the pressure in line 26 by some preselected amount, e.g. ten percent, the forces applied against endface 56 of secondary seat 30 overcome the force of spring 40 and the secondary seal seat member 30 opens away from gate 15. The differential surface area which operates under these conditions is illustrated by arrows 62, 64 while this differential surface area is the same as that illustrated in FIG. 3, the pressure is applied to endfaces 46 and 56 from within chamber 12 instead of against endfaces 54 and 56 from the conduit 26. As the secondary seal is deenergized, the force acting in chamber 52 and at endface 36 overcomes the forces acting against endface 37 also moving primary seat 28 away from gate 15 permitting fluid to flow from chamber 12 into conduit 26. The differential surface area is illustrated by arrow 66. Fluid passes into conduit 26 until the pressure in chamber 12 decreases sufficiently to allow the spring force of spring 40 to move endface 56 into engagement with gate 15 whereupon the forces are applied as if the endface 36 of seat 28 has been damaged and the secondary seal is energized. With the fluid pressures at each end of seat 28 now being equal, as described above with regard to FIG. 2, the primary seal at endface 36 also will be re-energized by spring 32.

To use the block-and-bleed feature of this invention, with the gate 15 closed, chamber 12 can be bled through a test fitting 70 which can be a needle valve, or other conventional construction. If the seal is energized, there will be no buildup of pressure in chamber 12.

Accordingly, because many varying and different embodiments may be made within the scope of the inventive concept herein taught including equivalent structures or materials hereafter thought of, and because many modifications may be made in the embodiments herein detailed in accordance with the descriptive requirements of the law, it is to be understood that the details herein are to be interpreted as illustrative and not in a limiting sense.

While a preferred embodiment of the invention has been described and shown in the drawings, modifications can be made by persons skilled in the art without departing from the spirit of the invention and what I claim is:

1. In a gate valve comprising:

a valve body having a valve chamber therein and a pair of flow passages extending therethrough at opposite sides of said valve chamber; and, a gate member within said valve chamber and reciprocably movable along a line transverse to said valve body flow passages between a gate position in which said valve is closed and a gate position in which said valve is open, said gate member having a flow passage therethrough which is aligned with the valve body flow passages when said gate member is in said open position and an imperforate portion which is aligned with said valve body flow passages when said gate member is in said closed position, said gate member being adapted to seal the downstream valve body flow passage by fluid pressure against the gate member on the upstream side thereof from the upstream valve body flow passage, the valve body and gate means being constructed such that fluid from the upstream valve body flow passage passes into the valve body during movement of the gate member between the open position and closed position;

the improvement comprising seal means for preventing flow of fluid from said upstream valve body flow passage along the surface of the gate member imperforate section, said seal means including a primary seal means and a secondary seal means;

said primary seal means comprising a recess around the inner end of at least said upstream flow passage adjacent the gate member, a primary seal seat member slidably mounted in said recess and surrounding the upstream flow passage adjacent to said gate member, said primary seal seat member having a first surface and a second surface, primary seal spring means normally biasing said primary seal seat member toward the gate member such that when the gate member is in said closed position an initial primary seal is provided by said primary seal seat member against said gate member at said first surface; said first surface and said second surface each being exposed to the pressure of fluid in said upstream flow passage, said second surface having an area exposed to such fluid pressure greater than the area of said first surface exposed to such fluid pressure whereby the fluid pressure in said upstream flow passage forces the primary seal seat member against the gate member and establishes a primary seal preventing flow along the surface of said gate member when it is in said closed position;

said secondary seal means comprising a secondary seal seat member slidably mounted on and closely surrounding said primary seal seat member, said secondary seal seat member having a first surface and a second surface, and secondary seal spring means normally biasing said secondary seal seat member toward said gate member such that when the gate member is in said closed position an initial secondary seal is provided by said secondary seal seat member against said gate member at said first surface of the secondary seal seat member;

said first surface and said second surface of the secondary seal seat member being exposed to fluid pressure resulting from pressure of fluid in the upstream flow passage when said primary seal means leaks fluid along the surface of the gate member, said second surface of the secondary seal seat member having an area exposed to such fluid pressure greater than the area of said first surface of the secondary seal seat member exposed to such fluid pressure whereby the fluid pressure from the upstream flow passage forces the secondary seal seat member against the gate member and establishes a secondary seal preventing flow along the surface of said gate member when said gate member is in the closed position and said primary seal means leaks;

said primary seal seat member comprising an annular ring member having an enlarged ring-like body portion on the outside thereof, said secondary seal seat member comprising an annular ring member having a portion thereof extending over said enlarged body portion of the primary seal seat member to create therewith a chamber into which fluid can pass from the upstream flow passage upon leaking of the primary seal means, a surface of said chamber being said second surface of said secondary seal seat member.

2. In a gate valve, the improvement as defined in claim 1, wherein said primary seal spring means is a resilient O-ring.

3. In a gate valve, the improvement as defined in claim 1, wherein said secondary seal spring means is a Belleville spring.

4. In a gate valve, the improvement as defined in claim 1, further including self-venting relief means for said valve chamber adapted to relieve pressure in said valve chamber through both the secondary seal means and the primary seal means when such pressure is greater than the pressure in said upstream flow passage, the secondary seal relief means comprising said first surface of the secondary seal seat member and said secondary seal spring means, the surface area of said first surface exposed to fluid pressure in said valve chamber being selected such that when the force applied against said first surface by fluid pressure exceeds a predetermined amount such force will overcome the spring force of the secondary seal spring means and open the secondary seal means to permit flow from the valve chamber into the upstream flow passage, and the primary seal relief means comprising he first surface of said primary seal seat member and the primary seal spring means, the surface end of said first surface exposed to fluid pressure in said valve chamber being selected such that when the force applied against said first surface by such fluid pressure exceeds a predetermined amount such force will overcome the spring force of the primary seal spring means and open the primary seal means to permit flow from the valve chamber into the upstream flow passage.

5. In a gate vale, the improvement as defined in claim 4, wherein each of said primary seal seat members and said secondary seal seat members have a groove in their respective said first surface, a resilient ring seal disposed in each said groove normally bearing against said gate member in said closed position provide, respectively, the initial primary seal and initial secondary seal.

6. In a gate valve, the improvement as defined in claim 5, wherein said primary seal spring means is a resilient O-ring.

7. In a gate valve, the improvement as defined in claim 6, wherein said secondary seal spring means is a Belleville spring.

* * * * *